UNITED STATES PATENT OFFICE.

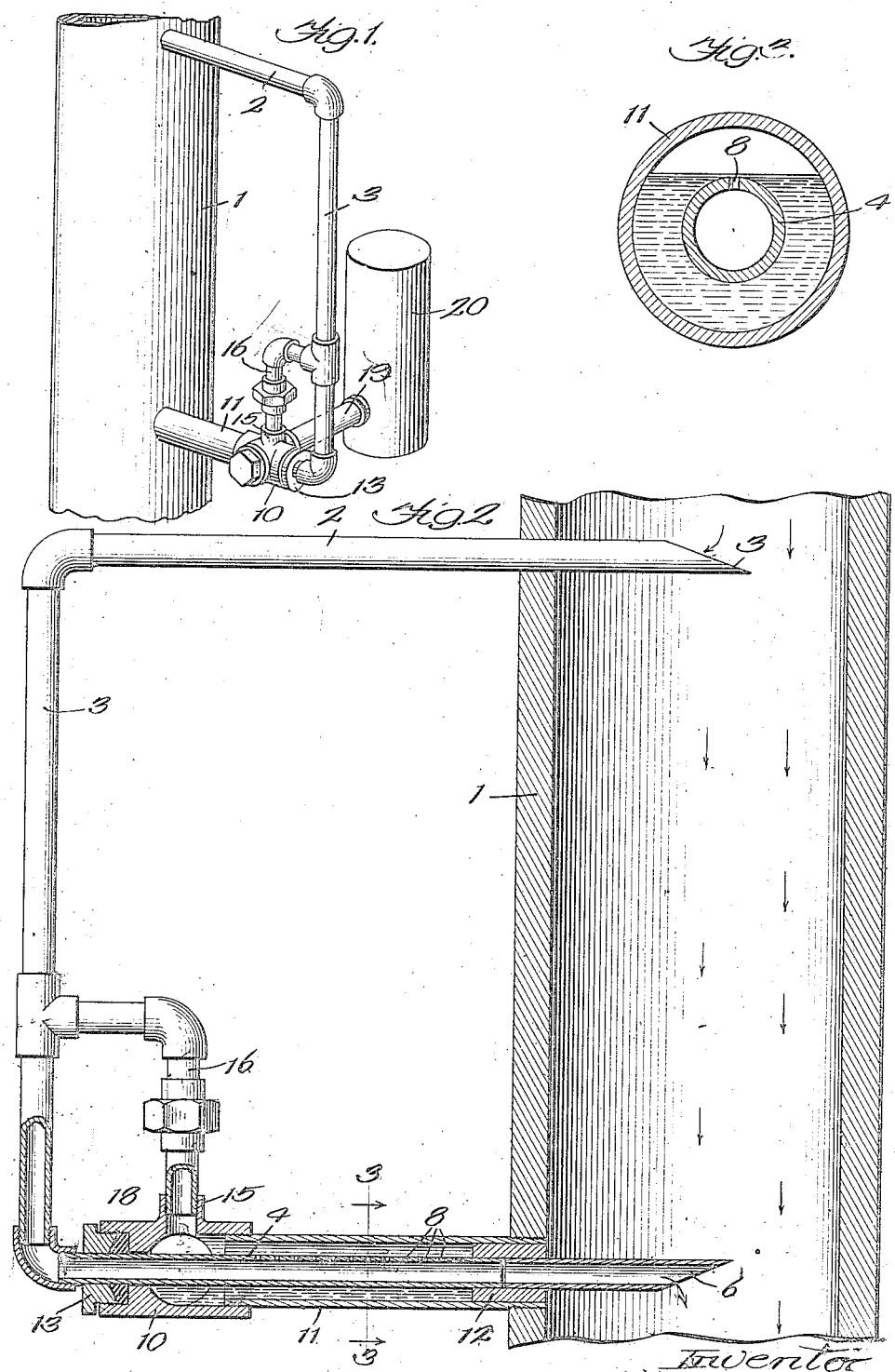

NELS H. LARSEN, OF CHICAGO, ILLINOIS.

ATOMIZER.

1,294,490.  Specification of Letters Patent.  Patented Feb. 18, 1919.

Application filed September 9, 1918. Serial No. 253,276.

*To all whom it may concern:*

Be it known that I, NELS H. LARSEN, a citizen of the United States, residing at Chicago, in the county of Cook and State of Illinois, have invented a certain new and useful Improvement in Atomizers, of which the following is a specification.

My invention relates to atomizers for introducing lubricating oil into the cylinder of a steam engine having a reciprocating piston. It is well recognized that it is advantageous to lubricate the engine piston by introducing atomized oil into the steam supply, thus causing the oil to be widely distributed and lubricate the entire cylinder with a mimimum of oil. The object of my invention is to provide an improved device for this purpose, and this object is obtained by a construction illustrated in the accompanying drawing, in which Figure 1 is a perspective view of my apparatus associated with the steam supply pipe leading to the engine cylinder.

Fig. 2 is an enlarged view chiefly in axial section.

Fig. 3 is a sectional elevation on the line 3—3, Fig. 2.

Similar numerals refer to similar parts throughout the several views.

In the form selected to illustrate the invention the main steam supply pipe which leads from the water to the engine cylinder is represented by the reference numeral 1. This is here shown to be arranged vertically. Leading out through the side of supply pipe 1 is a pipe 2 having a receiving nozzle 3 formed by an oblique cut and facing up stream with respect to the direction of flow of steam in pipe 1. Pipe 2 is approximately horizontal and connects with the upper end of the down pipe 3. At its lower end pipe 3 connects with pipe 4 which is arranged horizontally and passes through the side of pipe 1. It is provided at its inner end with a nozzle 6 which faces down stream as shown in Fig. 2. A series of apertures 8 is formed in the top side of pipe 4 for admitting oil and water in the manner hereinafter described.

Near the outer end of pipe 4 is a casing 10 which surrounds pipe 4, and connects to a pipe 11 which is of considerably larger diameter than pipe 4. The inner end of pipe 11 screws into the side of the main steam supply pipe 1 and the inner end of pipe 8 is closed by an annular plug or bushing 12.

A stuffing nut 13 screws into the outer end of casing 10 and the result is that the casing and the pipe 11 form a jacket around the pipe 4. There is no outlet from this jacket except through apertures 8 in the top side of pipe 4. The casing 10 has an inlet 14 into which leads a pipe 16 which branches out of pipe 3 at a point somewhat above the top casing. Thus the jacket around the pipe 4 is kept under the steam pressure equal to that in the down pipe 3 at the point where the pipe 16 joins it. The casing also has an inlet 18 for lubricating oil, the oil being led to the inlet through a pipe 19 leading from a lubricator 20. The lubricator may assume various forms, and I have here represented it only symbolically. It may assume the form of a pressure lubricator, or a force feed lubricator, both of which types are on the market and well known to those skilled in this art. The function of the lubricator is simply to supply oil at a predetermined rate to the casing 10 under a pressure sufficient to force it to enter said casing.

Operation: It will be understood that when steam is flowing downward in the main supply pipe 1, as indicated by the arrows in Fig. 2, a portion of it will circulate in the pipes 2, 3 and 4, the steam entering the nozzle 3, thence flowing outward in pipe 2, downward in pipe 3, and inward in pipe 4, finally emerging from nozzle 6 and passing thence toward the engine cylinder. As the inner end or nozzle of pipe 4 is unobstructed, and as the inlet of branch 16 is located in the duct back some distance from said nozzle, there is a greater pressure at the inlet end of branch 16 than in pipe 4; hence a portion of the steam in pipe 3 will pass through branch 16 into the jacket surrounding pipe 4, and through the apertures 8 into pipe 4, where it will mingle with the steam in pipe 4. As the outer surface of pipe 11 of the jacket is cooler than pipe 4, being more directly exposed to the atmosphere, condensation occurs in the jacket; and after the device has been in operation some time the jacket will become filled with water and oil until the surface of the liquid reaches the level of the upper ends of the apertures 8, as indicated in Fig. 3. Thereupon the steam blowing down through apertures 8 will entrain some of the oil and water with it, thus causing them to be atomized and commingled with the steam in pipe 4. It will be noted tha in this, the preferred form, the pipe 4 is cylindrical. This means that the liquid level will be tangential to the top side of the pipe, and hence the film flowing over into the apertures 8 is always quite thin. This also promotes atomization.

Another advantage of my device is that there is no danger of obstructing the flow of steam. Even if the apertures 8 became clogged, there would be no tendency to clog pipe 4, which is unobstructed at all times. But there is little tendency for the apertures 8 to clog because only a comparatively small amount of fluid passes through them. This is an important improvement over that type of atomizer in which baffles are placed in the principal duct of the atomizing device.

It will be understood that the form of the parts may be varied somewhat without departing from the spirit of the invention, which is defined in the following claims.

Having thus described my invention what I claim as new and desire to secure by Letters Patent, is:—

1. An atomizer having a main steam duct, a jacket surrounding said duct, there being an opening leading from the jacket to the inside of the steam duct, means for supplying oil to said jacket, and means for also supplying steam under pressure to said jacket for forcing a mixture of oil and water of condensation from the jacket to the inside of said steam duct through the said opening.

2. An atomizer having a main steam duct arranged horizontally and having a plurality of small openings in the top, a jacket for said duct, means for supplying oil to said jacket, and means for supplying steam under pressure to said jacket for forcing through said openings into the main steam duct such fluid as reaches a level sufficient to enable it to flow into said openings.

3. A structure as specified in claim 2 in which the horizontal portion of the main duct is cylindrical so that the fluid reaching the openings in the top is shallow.

4. In an atomizer, a cylindrical main steam duct, a jacket for said duct, there being an opening in said duct leading from the jacket to the inside of the duct, means for supplying oil under pressure to said jacket, a source of steam supply under pressure leading to said duct, and a branch leading from said source to said jacket.

5. In a device of the class described, the combination, with a vertically arranged main supply pipe for supplying steam to an engine cylinder, of a duct leading out from the side of said pipe, thence downward and thence inward to the inside of said pipe, a jacket around the portion of said duct which leads inward, there being an opening leading from said jacket to the inside of the last mentioned part of the duct, a branch tube leading from the downwardly extending portion of said duct into said jacket, and means for forcing oil into said jacket.

6. In a device of the class described, the combination with a vertically arranged main steam supply pipe, of a horizontal pipe leading out of the side of it, a down pipe leading from the outer end of said horizontal pipe, a second horizontal pipe leading from the lower end of the down pipe into the inside of the main supply pipe, said second horizontal pipe having a plurality of apertures near the top, a jacket surrounding the second horizontal pipe, a branch leading from the down pipe to the jacket, and means for forcing oil into the jacket.

7. In a device of the class described, the combination with a vertically arranged main steam supply pipe, of a horizontal pipe leading out of the side of it, a down pipe leading from the outer end of said horizontal pipe, a second horizontal pipe leading from the lower end of the down pipe into the inside of the main supply pipe, a jacket surrounding the second horizontal pipe, a branch leading from the down pipe to the jacket, and means for forcing oil into the jacket, the second horizontal pipe being circular in cross-section and having apertures along the top for the purpose described.

In witness whereof I have hereunto subscribed my name.

NELS H. LARSEN.